US011655376B2

(12) United States Patent
Oiwa et al.

(10) Patent No.: US 11,655,376 B2
(45) Date of Patent: May 23, 2023

(54) SURFACE CONTROL AGENT FOR WATER-BASED COATING, WATER-BASED COATING COMPOSITION, COATING FILM, AND MULTILAYER COATING FILM

(71) Applicant: KUSUMOTO CHEMICALS, LTD., Tokyo (JP)

(72) Inventors: Yasuhiro Oiwa, Saitama (JP); Kohei Ogawa, Saitama (JP)

(73) Assignee: KUSUMOTO CHEMICALS, LTD., Tokyo (JP)

(*) Notice: Subject to any disclaimer, the term of this patent is extended or adjusted under 35 U.S.C. 154(b) by 0 days.

(21) Appl. No.: 17/257,872

(22) PCT Filed: Jul. 5, 2019

(86) PCT No.: PCT/JP2019/026839
§ 371 (c)(1),
(2) Date: Jan. 5, 2021

(87) PCT Pub. No.: WO2020/009228
PCT Pub. Date: Jan. 9, 2020

(65) Prior Publication Data
US 2021/0301148 A1    Sep. 30, 2021

(30) Foreign Application Priority Data

Jul. 6, 2018  (JP) ............... JP2018-129496

(51) Int. Cl.
| C09D 5/00 | (2006.01) |
| C09D 7/65 | (2018.01) |
| C09D 7/47 | (2018.01) |
| B05D 1/26 | (2006.01) |
| B05D 5/08 | (2006.01) |
| B05D 7/00 | (2006.01) |

(52) U.S. Cl.
CPC ............. C09D 5/002 (2013.01); B05D 1/26 (2013.01); B05D 5/08 (2013.01); B05D 7/532 (2013.01); C09D 7/47 (2018.01); C09D 7/65 (2018.01); *B05D 2320/00* (2013.01); *B05D 2401/20* (2013.01)

(58) Field of Classification Search
CPC . C09D 5/002; C09D 7/65; C09D 7/47; B05D 1/26; B05D 5/08; B05D 7/532; B05D 2320/00; B05D 2401/20
See application file for complete search history.

(56) References Cited

U.S. PATENT DOCUMENTS

2009/0075063 A1    3/2009  Iida et al.
2018/0044551 A1*   2/2018  Ogawa ................ C09D 5/00

FOREIGN PATENT DOCUMENTS

| CN | 101392138 A | 3/2009 |
| EP | 3196959 A1 | 7/2017 |
| JP | 2002-263569 A | 9/2002 |
| JP | 2002-265862 A | 9/2002 |
| JP | 2002-363504 A | 12/2002 |
| JP | 2006-56950 A | 3/2006 |
| JP | 2006-56952 A | 3/2006 |
| JP | 2011-105786 A | 6/2011 |
| WO | 2016/152235 A1 | 9/2016 |

OTHER PUBLICATIONS

International Search Report and Written Opinion dated Aug. 27, 2019, received for PCT Application No. PCT/JP2019/026839, Filed on Jul. 5, 2019, 8 pages including English Translation.
Office Action dated Jul. 13, 2021, in corresponding Chinese patent Application No. 201980038550.3, 13 pages.
Extended European search report dated Jul. 19, 2021, in corresponding European patent Application No. 19830904.9, 7 pages.
Korean Office Action dated Nov. 16, 2022, in corresponding Korean Patent Application No. 10-2020-7036095, 9pp.

* cited by examiner

*Primary Examiner* — Robert S Walters, Jr.
(74) *Attorney, Agent, or Firm* — Xsensus LLP

(57) ABSTRACT

[Problem] To provide a surface control agent for a water-based coating, the surface control agent having both cissing prevention properties and overcoatability when used for applications requiring excellent appearance and overcoatability.

[Solution] The surface control agent for a water-based coating includes: a copolymer containing, as constituent monomers, a dibasic acid ester (A) having a polymerizable unsaturated double bond in an amount of 10% by mass or more and 99% by mass or less, and an ether group-containing polymerizable unsaturated monomer (B) having a (meth) acryloyl group, a vinyl ether group, or an allyl group in an amount of 1% by mass or more and 90% by mass or less, wherein the copolymer has a weight-average molecular weight of 1,000 or more and 100,000 or less.

7 Claims, No Drawings

SURFACE CONTROL AGENT FOR WATER-BASED COATING, WATER-BASED COATING COMPOSITION, COATING FILM, AND MULTILAYER COATING FILM

CROSS-REFERENCE TO RELATED APPLICATIONS

The present application is based on PCT filing PCT/JP2019/026839, filed Jul. 5, 2019, which claims priority to JP 2018-129496, filed Jul. 6, 2018, the entire contents of each are incorporated herein by reference.

TECHNICAL FIELD

The present invention relates to surface control agents for water-based coatings, water-based coating compositions, coating films, and multilayer coating films.

BACKGROUND ART

For coating of various objects such as automobile materials, high class furniture, and home appliances, it is required to form coating films having an excellent aesthetic appearance and excellent finish, that is, smooth appearance without cissing, cratering, fish eyes, cloudiness, and the like, in addition to providing an anti-corrosion effect. Therefore, in coating lines for such objects, air sprays, roll coaters, or the like are used in coating. During such coating, contaminants such as lubricant used in a compressor, roll coater, or the like, or mist of the coating itself may adhere to a surface of an object to be coated. Since these contaminants have a surface tension lower than that of the vehicle, there has been a problem of occurrence of cissing in the coating due to adhesion of contaminants on a surface of an object to be coated. Furthermore, in coating lines such as those for automobile materials, in which objects to be coated are subjected to coating and polishing several times, cissing may also occur due to contamination of the objects by different types of dust such as polishing debris from a sandpaper and from the worker's fingerprints.

Moreover, in view of resource saving, environmental protection, and the like, water-based coatings, instead of solvent-based coatings, have been recently used as coatings for the above-mentioned coating. Water-based coatings have problems attributed to the physical properties of solvent water. For example, in application of water-based coatings to an object to be coated, wettability between the water-based coating and the object to be coated becomes insufficient due to the high surface tension of water, resulting in the occurrence of cissing. Further, due to non-uniform surface tension of the water-based coating, crater may occur on a surface of a coating film formed of the dried and cured water-based coating.

In order to solve the above problems, surface control agents such as leveling agents, wetting agents, slipping agents, and anti-cissing agents have been used as additives for water-based coatings.

As an example of such surface control agents, PTL 1 discloses improvement in adhesion of a water-based coating containing a silicone-based surface control agent to a topcoat. According to PTL 1, a wettability improving agent containing a copolymer of a specific ether group-containing alkyl (meth)acrylate monomer and a specific alkyl (meth)acrylate monomer is used as a surface control agent for water-based coatings.

CITATION LIST

Patent Literature

PTL 1: JP 2011-105786 A

SUMMARY OF THE INVENTION

Technical Problem

However, according to a study by the present inventors, the wettability improving agent for water-based coatings disclosed in PTL 1 has a problem that the cissing prevention properties (capability of preventing occurrence of cissing and cratering) are insufficient for applications such as coating of automobile materials, high class furniture, home appliances, and the like, which require excellent appearance and overcoatability. In addition, the wettability improving agent may affect the overcoatability (interlayer adhesion between a coating film obtained by drying and curing a water-based coating and a topcoat film), or may cause roughening of the surface of the topcoat film. Furthermore, the wettability improving agent itself may separate from the coating components.

Thus, surface control agents for water-based coatings having both cissing prevention properties and overcoatability at a high level have not been available for applications such as coating of automobile materials, high class furniture, home appliances, and the like, which require excellent appearance and overcoatability. Accordingly, there has been a need for such surface control agents.

Therefore, the present invention has been made in view of the above circumstances, and aims to provide a surface control agent for a water-based coating, having both cissing prevention properties and overcoatability when used for applications requiring excellent appearance and overcoatability.

Solution to Problem

The present inventors have diligently conducted research to solve the above problems and found that a surface control agent for a water-based coating, having both cissing prevention properties and overcoatability at a high level when used for applications requiring excellent appearance and overcoatability, can be provided by incorporating a copolymer (P) described below into a surface control agent for a water-based coating. Based on this knowledge, the present invention has been completed. The copolymer (P) is obtained by polymerizing at least a mixed monomer in which a dibasic acid ester (A) having a polymerizable unsaturated double bond is mixed with an ether group-containing polymerizable unsaturated monomer (B) having a specific polymerizable unsaturated double bond at a specific ratio. The copolymer (P) has a weight-average molecular weight in a specific range.

That is, the present invention is a surface control agent for a water-based coating, the surface control agent including: a copolymer (P), which is a copolymer (P1) containing, as constituent monomers, a dibasic acid ester (A) having a polymerizable unsaturated double bond in an amount of 10% by mass or more and 99% by mass or less, and a polymerizable unsaturated monomer (B) containing an ether group represented by a general formula (1):

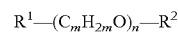

$$R^1-(C_mH_{2m}O)_n-R^2 \quad (1)$$

(where $R^1$ represents a (meth)acryloyl group, a vinyl ether group, or an allyl group, $R^2$ represents a hydrogen atom, a (meth)acryloyl group, a vinyl ether group, an allyl group, or an alkyl group with 1 to 22 carbon atoms, m is a number from 2 to 4, and n is a number from 2 to 100) in an amount of 1% by mass or more and 90% by mass or less, wherein the copolymer (P) has a weight-average molecular weight of 1,000 or more and 100,000 or less.

In an aspect of the present invention, the copolymer (P) may be a copolymer (P2) containing, as constituent monomers, the dibasic acid ester (A), the polymerizable unsaturated monomer (B), and a copolymerizable unsaturated monomer (C) in an amount of 400 parts by mass or less when a total amount of the dibasic acid ester (A) and the polymerizable unsaturated monomer (B) is 100 parts by mass, and the copolymerizable unsaturated monomer (C) is a monomer different from the dibasic acid ester (A) and the polymerizable unsaturated monomer (B).

In another aspect of the present invention, the dibasic acid ester (A) is preferably at least one monomer selected from the group consisting of maleic acid diester, maleic acid monoester, fumaric acid diester, fumaric acid monoester, itaconic acid diester, itaconic acid monoester, citraconic acid monoester, citraconic acid diester, mesaconic acid monoester, and mesaconic acid diester.

In the above aspect of the present invention, $R^2$ in the general formula (1) is preferably a (meth)acryloyl group, a vinyl ether group, or an allyl group.

In another aspect of the present invention, the copolymerizable unsaturated monomer (C) is preferably at least one monomer selected from the group consisting of a (meth)acrylic acid ester, polymerizable unsaturated monomer having a hydroxyl group, polymerizable unsaturated monomer having an amide group, polymerizable unsaturated monomer having a glycol group, polymerizable unsaturated monomer having a glycidyl group, polymerizable unsaturated monomer having a carboxyl group, multi-functional unsaturated monomer, and a reactive silicone having a methacryloyloxy group.

Further, the present invention is a water-based coating composition including: the aforementioned surface control agent for a water-based coating in an amount of 0.1% by mass or more and 10% by mass or less when a total resin solid content is 100% by mass.

Further, the present invention is a coating film obtained by curing the aforementioned water-based coating composition.

Further, the present invention is a multilayer coating film including: the aforementioned coating film; and a topcoat film applied to all or part of a surface of the coating film.

Advantageous Effects of Invention

According to the present invention, a surface control agent for a water-based coating, having both cissing prevention properties and overcoatability when used for applications requiring excellent appearance and overcoatability, can be provided by incorporating the above specific polymer into a surface control agent.

DESCRIPTION OF EMBODIMENTS

In the following description, preferred embodiments of the present invention will be described in detail. In the specification, "(meth)acrylic acid" refers to at least one of "acrylic acid" and "methacrylic acid," and "(meth)acrylate" refers to at least one ester selected from "acrylate" and "methacrylate," and "(di)mono" refers to "di" or "mono."

[Surface Conditioner for Water-Based Coating]

A surface control agent for a water-based coating according to the present invention contains a copolymer (P1) of a dibasic acid ester (A) and a polymerizable unsaturated monomer (B). The dibasic acid ester (A) has a polymerizable unsaturated double bond. The polymerizable unsaturated monomer (B) is a monomer containing an ether group represented by the following general formula (1):

$$R^1-(C_mH_{2m}O)_n-R^2 \qquad (1)$$

In the above general formula (1), $R^1$ represents a (meth)acryloyl group, a vinyl ether group or an allyl group, $R^2$ represents a hydrogen atom, a (meth)acryloyl group, a vinyl ether group, an allyl group, or an alkyl group with 1 to 22 carbon atoms, m is a number from 2 to 4, and n is a number from 2 to 100.

The molecular skeleton of the copolymer (P1) is, for example, a graft copolymer composed of a hydrophobic backbone polymer derived from the dibasic acid ester (A) and a hydrophilic branch polymer derived from the polymerizable unsaturated monomer (B) (the hydrophilic branch polymer contains an ether group). However, the skeleton of the copolymer (P1) is not limited to the graft copolymer, and may be a random copolymer in which the dibasic acid ester (A) and the polymerizable unsaturated monomer (B) are randomly copolymerized, or a block copolymer of the dibasic acid ester (A) and the polymerizable unsaturated monomer (B).

Further, a copolymer contained in the surface control agent for a water-based coating according to the present invention may be a copolymer (P2) of the dibasic acid ester (A), the polymerizable unsaturated monomer (B), and a copolymerizable unsaturated monomer (C), which is described later. The molecular skeleton of the copolymer (P2) is not specifically limited, and may be any of a graft copolymer, a random copolymer, and a block copolymer.

In order to provide the surface control agent with good cissing prevention properties, the molecular weight of the polymer contained in the surface control agent is preferably relatively small (for example, the weight-average molecular weight is 100,000 or less, preferably 35,000 or less, and more preferably 10,000 or less). Due to the polymer having a relatively small molecular weight, the surface control agent can be easily oriented to a surface of the coating film, preventing occurrence of cissing and crater. Further, due to the polymer having a relatively small molecular weight, the surface control agent oriented to a surface of the coating film has an improved resolubility to a topcoat when the topcoat is applied. As a result, a coating film having good interlayer adhesion is obtained. As described above, in order to obtain a surface control agent having good cissing prevention properties and overcoatability, it is preferred to synthesize a polymer having a relatively small molecular weight. The polymer contained in the surface control agent of the present invention contains a dibasic acid ester (A) as a constituent monomer. In general, since the dibasic ester is not likely to react by ordinary radical polymerization, the molecular weight of the polymer is not likely to increase. Therefore, a polymer having a relatively small molecular weight can be synthesized by using the dibasic acid ester (A) as one of the constituent monomers. On the other hand, it is difficult to increase the degree of polymerization by the dibasic ester alone. The reason for this is that the ester bond in the dibasic ester causes steric hindrance, and inhibits the chain reaction in radical polymerization. When the molecular weight of the polymer is too small (for example, the weight-average molecular weight is less than 1,000), the surface control agent does not have sufficient capability of being oriented to a surface of the coating as described below during application of the coating. As a consequence, sufficient cissing prevention properties cannot be obtained. According to the present invention, the dibasic acid ester (A) is polymerized with a specific polymerizable unsaturated monomer (B) in a specific range of monomer ratio to synthesize a polymer of a molecular weight in a range suitable for obtaining a surface control agent having good cissing prevention properties and overcoatability.

Moreover, the dibasic acid ester (A) has a maximum of two ester bonds in each monomer unit. A hydrocarbon chain in the ester bond expresses a surface conditioning effect (in particular, a cissing prevention effect). Accordingly, the surface control agent of the present invention containing a polymer that uses the dibasic acid ester (A) as a constituent monomer has an unusually excellent surface conditioning effect.

(Dibasic Acid Ester (A))

The dibasic acid ester (A) used for a monomer of the copolymer (P1) and the copolymer (P2) is not specifically limited as long as the dibasic ester has a polymerizable unsaturated bond, and may be at least one monomer selected from the group consisting of maleic acid diester, maleic acid monoester, fumaric acid diester, fumaric acid monoester, itaconic acid diester, itaconic acid monoester, citraconic acid monoester, citraconic acid diester, mesaconic acid monoester, and mesaconic acid diester.

More specifically, examples of the dibasic acid ester (A) include maleic acid di(mono)methyl ester, maleic acid di(mono)ethyl ester, maleic acid di(mono)n-propyl ester, maleic acid di(mono)isopropyl ester, maleic acid di(mono)n-butyl ester, maleic acid di(mono)isobutyl ester, maleic acid di(mono)n-octyl ester, maleic acid di(mono)2-ethylhexyl ester, maleic acid di(mono)isononyl ester, maleic acid di(mono)lauryl ester, maleic acid di(mono)stearyl ester, maleic acid di(mono)benzyl ester, fumaric acid di(mono) methyl ester, fumaric acid di(mono)ethyl ester, fumaric acid di(mono)n-propyl ester, fumaric acid di(mono)isopropyl ester, fumaric acid di(mono)n-butyl ester, fumaric acid di(mono)isobutyl ester, fumaric acid di(mono)n-octyl ester, fumaric acid di(mono)2-ethylhexyl ester, fumaric acid di(mono)isononyl ester, fumaric acid di(mono)lauryl ester, fumaric acid di(mono)stearyl ester, fumaric acid di(mono) benzyl ester, itaconic acid di(mono)methyl ester, itaconic acid di(mono)ethyl ester, itaconic acid di(mono)n-propyl ester, itaconic acid di(mono)isopropyl ester, itaconic acid di(mono)n-butyl ester, itaconic acid di(mono)isobutyl ester, itaconic acid di(mono)n-octyl ester, itaconic acid di(mono) 2-ethylhexyl ester, itaconic acid di(mono)isononyl ester, itaconic acid di(mono)lauryl ester, itaconic acid di(mono) stearyl ester, itaconic acid di(mono)benzyl ester, citraconic acid di(mono)methyl ester, citraconic acid di(mono)ethyl ester, citraconic acid di(mono)n-propyl ester, citraconic acid di(mono)isopropyl ester, citraconic acid di(mono)n-butyl ester, citraconic acid di(mono)isobutyl ester, citraconic acid di(mono)n-octyl ester, citraconic acid di(mono)2-ethylhexyl ester, citraconic acid di(mono)isononyl ester, citraconic acid di(mono)lauryl ester, citraconic acid di(mono)stearyl ester, citraconic acid di(mono)benzyl ester, mesaconic acid di(mono)methyl ester, mesaconic acid di(mono)ethyl ester, mesaconic acid di(mono)n-propyl ester, mesaconic acid di(mono)isopropyl ester, mesaconic acid di(mono)n-butyl ester, mesaconic acid di(mono)isobutyl ester, mesaconic acid di(mono)n-octyl ester, mesaconic acid di(mono)2-ethylhexyl ester, mesaconic acid di(mono)isononyl ester, mesaconic acid di(mono)lauryl ester, mesaconic acid di(mono) stearyl ester, and mesaconic acid di(mono)benzyl ester. These monomers may be used singly or in combination of two or more.

Among the above monomers, in order to enhance the effect of lowering the surface tension (surface-tension lowering effect) of the coating component (vehicle) to be lower than that of a contaminant that causes cissing, the dibasic acid ester (A) is preferably at least one monomer selected from the group consisting of maleic acid diester, maleic acid monoester, fumaric acid diester, and fumaric acid monoester, and more preferably at least one of maleic acid diester and fumaric acid diester.

The dibasic acid ester (A) is used in an amount of 10% by mass or more and 99% by mass or less when a total amount of the monomer mixture of the dibasic acid ester (A) and the polymerizable unsaturated monomer (B) is 100% by mass. When the dibasic acid ester (A) is less than 10% by mass, the copolymer (P1) and the copolymer (P2) have insufficient hydrophobic groups (non-polar groups) derived from the ester bond, and thus the surface-tension lowering effect is low. Accordingly, sufficient cissing prevention properties cannot be obtained. On the other hand, when the dibasic acid ester (A) is more than 99% by mass, the copolymer (P1) and the copolymer (P2) have excessive hydrophobic groups (non-polar groups) derived from the ester bond, and the dispersibility in the water-based coating composition is lowered. This adversely affects the appearance of the coating film, and deteriorates overcoatability. In order to enhance improvement in cissing prevention properties, the dibasic acid ester (A) is preferably used in an amount of 20% by mass or more. Further, in order to enhance improvement in overcoatability, the dibasic acid ester (A) is preferably used in an amount of 80% by mass or less, and more preferably 60% by mass or less.

(Polymerizable Unsaturated Monomer (B))

The polymerizable unsaturated monomer (B) used for a monomer of the copolymer (P1) and the copolymer (P2) is not specifically limited as long as the monomer contains an ether group represented by the general formula (1) described above. Examples of the polymerizable unsaturated monomer (B) include (meth)acrylates such as polyethylene glycol mono(meth)acrylate, poly(ethylene-propylene) glycol mono (meth)acrylate, polypropylene glycol mono(meth)acrylate, polytetramethylene glycol mono(meth)acrylate, methoxypolyethylene glycol (meth)acrylate, methoxypolypropylene glycol (meth)acrylate, methoxypoly(ethylene-propylene) glycol (meth)acrylate, methoxypoly(ethylene-tetramethylene) glycol (meth)acrylate, butoxypoly(ethylene-propylene glycol) (meth)acrylate, octoxypolyethylene glycol (meth) acrylate, lauroxypolyethylene glycol (meth)acrylate, stearoxypolyethylene glycol (meth)acrylate, behenyloxypolyethylene glycol (meth)acrylate, phenoxypolyethylene glycol (meth)acrylate, nonyl phenoxypolyethylene glycol (meth) acrylate, polyethylene glycol di(meth)acrylate, polypropylene glycol di(meth)acrylate, ethoxylated polypropylene glycol di(meth)acrylate, and polytetramethylene glycol di(meth)acrylate; allyl ethers such as polyethylene glycol monoallyl ether, polypropylene glycol monoallyl ether, methoxypolyethylene glycol allyl ether, polyethylene glycol polypropylene glycol monoallyl ether, butoxypolyethylene glycol polypropylene glycol monoallyl ether, polyethylene glycol diallyl ether, and polypropylene glycol diallyl ether; and vinyl ethers such as polyethylene glycol monovinyl ether, and polypropylene glycol monovinyl ether. These monomers may be used singly or in combination of two or more.

Among monomers described above, in order to enhance cissing prevention properties, $R^2$ in the general formula (1) is preferably a (meth)acryloyl group, a vinyl ether group, or an allyl group.

Further, the ether chain length (that is, n in the general formula (1)) in the polymerizable unsaturated monomer (B) is 2 or more and 100 or less. When n is less than 2 or more than 100, the coating film obtained by curing the water-based coating composition containing the surface control agent of the present invention has a deteriorated appearance. In order to improve the appearance of the coating film, n in the general formula (1) is preferably 4 or more and 50 or less.

The polymerizable unsaturated monomer (B) is used in an amount of 1% by mass or more and 90% by mass or less when a total amount of the monomer mixture of the dibasic acid ester (A) and the polymerizable unsaturated monomer (B) is 100% by mass. When the polymerizable unsaturated monomer (B) is less than 1% by mass, the copolymer (P1) and the copolymer (P2) have insufficient hydrophilic groups (polar groups) derived from the ether bond, and the dispersibility in the water-based coating composition is lowered. This adversely affects the appearance of the coating film, and deteriorates overcoatability. On the other hand, when the polymerizable unsaturated monomer (B) is more than 90% by mass, the copolymer (P1) and the copolymer (P2) have excessive hydrophilic groups (polar groups) derived from the ether bond, and thus the surface-tension lowering effect is low. Accordingly, sufficient cissing prevention properties cannot be obtained. In order to enhance improvement in cissing prevention properties, the polymerizable unsaturated monomer (B) is preferably used in an amount of 50% by mass or less, and more preferably 30% by mass or less. In order to enhance improvement in overcoatability, the polymerizable unsaturated monomer (B) is preferably used in an amount of 2% by mass or more, and more preferably 5% by mass or more.

(Copolymerizable Unsaturated Monomer (C))

In addition to the dibasic acid ester (A) and the polymerizable unsaturated monomer (B) described above, a copolymerizable unsaturated monomer (C) can be copolymerized in order to improve dispersibility and stability of the surface control agent in the water-based coating composition, and impart reactivity with the coating resin component to the surface control agent.

The copolymerizable unsaturated monomer (C) used for a monomer of the copolymer (P2) is not specifically limited as long as the monomer is different from the dibasic acid ester (A) and the polymerizable unsaturated monomer (B) described above, and may be at least one monomer selected from the group consisting of an alkyl (meth)acrylate, polymerizable unsaturated monomer having a hydroxyl group, polymerizable unsaturated monomer having an amide group, polymerizable unsaturated monomer having a glycol group, polymerizable unsaturated monomer having a glycidyl group, polymerizable unsaturated monomer having a carboxyl group, multifunctional unsaturated monomer, and a reactive silicone having a methacryloyloxy group.

More specifically, examples of the copolymerizable unsaturated monomer (C) include alkyl (meth)acrylates such as (meth)acrylic acid methyl ester, (meth)acrylic acid ethyl ester, (meth)acrylic acid n-propyl ester, (meth)acrylic acid isopropyl ester, (meth)acrylic acid n-butyl ester, (meth)acrylic acid isobutyl ester, (meth)acrylic acid tertiary butyl ester, (meth)acrylic acid n-octyl ester, (meth)acrylic acid 2-ethylhexyl ester, (meth)acrylic acid isononyl ester, (meth)acrylic acid lauryl ester, (meth)acrylic acid stearyl ester, (meth)acrylic acid cyclohexyl ester, and (meth)acrylic acid isobonyl ester; hydroxyl group-containing (meth)acrylates, which are monoesterified products of (meth)acrylate and divalent alcohol with 2 to 8 carbon atoms, such as 2-hydroxyethyl (meth)acrylate, 2-hydroxypropyl (meth)acrylate, 2-hydroxy-1-methylethyl (meth)acrylate, 4-hydroxybutyl (meth)acrylate, or 3-hydroxy-2,2-dimethylpropyl (meth) acrylate; glycol (meth)acrylates such as phenoxyethylene glycol (meth)acrylate, and phenoxypropylene glycol (meth) acrylate; acrylamides or methacrylamides such as acrylamide, N-methyl acrylamide, N-methyl methacrylamide, N-methylolacrylamide butyl ether, N-methylolmethacrylamide butyl ether, N-ethylacrylamide, N-ethylmethacrylamide, N-n-propyl acrylamide, N-n-propyl methacrylamide, N-isopropyl acrylamide, N-isopropyl methacrylamide, N-cyclopropyl acrylamide, N-cyclopropyl methacrylamide, diacetone acrylamide, diacetone methacrylamide, N-hydroxymethyl acrylamide, N-hydroxymethyl methacrylamide, N-hydroxyethylacrylamide, N-hydroxyethylmethacrylamide, N,N-dimethylacrylamide, N,N-dimethylmethacrylamide, N,N-diethylacrylamide, N,N-diethylmethacrylamide, N-methyl-N-ethylacrylamide, N-methyl-N-ethylmethacrylamide, N,N-dimethylaminopropyl acrylamide, N,N-dimethylaminopropyl methacrylamide, N-methylolacrylamide methyl ether, N-methylolmethacrylamide methyl ether, N-methylolacrylamide ethyl ether, N-methylolmethacrylamide ethyl ether, N-methylolacrylamide propyl ether, N-methylolmethacrylamide propyl ether, acryloylmorpholine, and methacryloyl morpholine; hydrophilic vinyl compounds such as N-vinyl-2-pyrrolidone; carboxyl group-containing polymerizable unsaturated monomers such as (meth)acrylic acid, maleic acid, fumaric acid, itaconic acid, crotonic acid, and β-carboxyethylacrylates; glycidyl group-containing polymerizable unsaturated monomers such as glycidyl (meth)acrylate, and acrylic glycidyl ether; reactive silicones having a methacryloyloxy group (for example, available as Silaplane FM-0711, FM-0721, and FM-0725 manufactured by JNC Corporation; AK-5 and AK-30 manufactured by Toagosei Co., Ltd.; and X22-164A, X22-164B, and X22-164C manufactured by Shin-Etsu Silicone Co., Ltd); multifunctional unsaturated monomers such as divinylbenzene, ethylene glycol di(meth) acrylate, propylene glycol di(meth)acrylate, tetramethylene glycol di(meth)acrylate, 1,6-hexamethylene glycol di(meth) acrylate, and neopentyl glycol di(meth)acrylate. These monomers may be used singly or in combination of two or more.

The copolymerizable unsaturated monomer (C) is preferably used in an amount of more than 0 part by mass and 400 parts by mass or less when a total amount of the dibasic acid ester (A) and the polymerizable unsaturated monomer (B) is 100 parts by mass, more preferably 200 parts by mass or less, and still more preferably 100 parts by mass or less. When the copolymerizable unsaturated monomer (C) is 400 parts by mass or less, it is possible to enhance improvement in dispersibility and stability of the surface control agent in the water-based coating composition, and impartment of reactivity with the coating resin component to the surface control agent. Further, in order to enhance the effect by adding the copolymerizable unsaturated monomer (C) (improvement in the above dispersibility and stability, impartment of reactivity, and the like), the amount is preferably 10 parts by mass or more, and more preferably 20 parts by mass or more.

(Average Molecular Weight of Copolymer)

Each of the copolymer (P1) and the copolymer (P2) have a weight-average molecular weight of 1,000 or more and 100,000 or less. When the weight-average molecular weight of each of the copolymer (P1) and the copolymer (P2) is less than 1,000, the copolymer (P1) and the copolymer (P2) blended in the water-based coating do not have sufficient capability of being oriented to a surface of the coating during application of the coating. As a consequence, sufficient cissing prevention properties cannot be obtained. On the other hand, when the weight-average molecular weight of each of the copolymer (P1) and the copolymer (P2) is more than 100,000, resolubility of the copolymer (P1) and the copolymer (P2) to the topcoat is lowered, which deteriorates overcoatability. In order to enhance the cissing prevention properties, the weight-average molecular weight of each of the copolymer (P1) and the copolymer (P2) is preferably 3,000 or more. In order to further enhance the overcoatability, the weight-average molecular weight of each of the copolymer (P1) and the copolymer (P2) is preferably 35,000 or less, and more preferably 10,000 or less.

The weight-average molecular weight described herein is a value calculated based on a molecular weight of standard polystyrene in a chromatogram measured by gel permeation chromatography (GPC). In the examples described later, the weight-average molecular weight was measured by using "HLC-8320GPC" (trade name, manufactured by Tosoh Corporation) as a measurement device for gel permeation chromatogram. The measurement was performed with a total of four columns (2 columns of "TSKgel GMHxL," 1 column of "TSKgel G-2500HxL," and 1 column of "TSKgel G-2000HxL" (trade names, all manufactured by Tosoh Corporation)), using tetrahydrofuran as a mobile phase, at a measurement temperature of 40° C., a flow rate of 1 cc/min, and using a differential refractometer (RI) as a detector.

(Method for Synthesizing Copolymer)

The copolymer (P), that is, the above copolymer (P1) and copolymer (P2) contained in the surface control agent of the present invention can be synthesized by, for example, emulsion polymerization, suspension polymerization, solution polymerization, bulk polymerization, or the like. Further, as a polymerization initiator, generally used azo polymerization initiators, peroxides, and the like may be used. Methods for synthesizing the copolymers are not specifically limited since they do not affect functions and performances of the surface control agent.

(Components of Surface Conditioner Other than Copolymers)

The surface control agent according to the present invention may include, if necessary, water or an organic solvent in order to facilitate dispersion of the copolymer (P) in the water-based coating. The organic solvent used for the surface control agent may be aliphatic hydrocarbons, alicyclic hydrocarbons, aromatic hydrocarbons, ketones, esters, alcohols, ethers, or the like, but is preferably an organic solvent used in general waterborne coatings. Examples of such an organic solvent include methyl alcohol, ethyl alcohol, propyl alcohol, isopropyl alcohol, butyl alcohol, isobutyl alcohol, pentyl alcohol, hexyl alcohol, heptyl alcohol, octyl alcohol, 2-ethylhexyl alcohol, ethylene glycol monomethyl ether, diethylene glycol monomethyl ether, triethylene glycol monomethyl ether, ethylene glycol monoisopropyl ether, ethylene glycol monobutyl ether, diethylene glycol monobutyl ether, triethylene glycol monobutyl ether, ethylene glycol monoisobutyl ether, ethylene glycol monohexyl ether, ethylene glycol mono(2-ethylhexyl) ether, propylene glycol monomethyl ether, propylene glycol monomethyl ether acetate, dipropylene glycol monomethyl ether, propylene glycol monopropyl ether, and propylene glycol monobutyl ether. These organic solvents may be used singly or in combination of two or more.

Further, the surface control agent of the present invention can contain other substances within a range that does not impair the characteristics thereof and purposes of the present invention. Examples of such substances include surfactants, film-forming aids, dryers, anti-fouling agents, thickeners, antioxidants, UV absorbers, water resistant agents, antiseptic and antifungal agents, defoamers, leveling agents, dispersants, flame retardants, adhesion improving agents, colorants, antistatic agents, release agents, coupling agents, deodorants, fragrances, dyes, and other additives.

(Applications of Surface Conditioner)

The surface control agent for a water-based coating according to the present invention is suitable for use in water-based coatings such as coatings for automobile materials, coatings for high class furniture, coatings for home appliances, and the like, which require excellent appearance and overcoatability. Examples of such water-based coatings include water-based base coatings for automobiles, water-based intermediate coatings for automobiles, water-based primer coatings for automobiles, water-based coatings for high class furniture, and the like. The surface control agent of the present invention can be added to these water-based coatings to impart sufficient cissing prevention properties and good overcoatability to the water-based coatings.

[Water-Based Coating Composition]

A water-based coating composition according to the present invention contains the aforementioned surface control agent for a water-based coating. The content of the surface control agent for a water-based coating according to the present invention varies depending on the type of resin which is a component of the coating in the water-based coating, the formulation composition of the pigment, and the like, but is typically 0.1% by mass or more and 10% by mass or less when a total resin solid content in the water-based coating is 100% by mass. The content of the surface control agent of the present invention is a percentage of the solid content in the surface control agent (% by mass) when the total resin solid content in the water-based coating is 100% by mass. When the content of the surface control agent is less than 0.1% by mass, sufficient cissing prevention properties are not imparted to the water-based coating composition. On the other hand, when the content of the surface control agent is more than 10% by mass, the overcoatability of the water-based coating composition is hindered. In order to further enhance the cissing prevention properties, the content of the surface control agent in the water-based coating composition is preferably 0.5% by mass or more, and more preferably 1% by mass or more. Further, in order to further enhance the overcoatability, the content of the surface control agent in the water-based coating composition is preferably 5% by mass or less.

(Coating Components)

The coating components contained in the water-based coating composition of the present invention are not specifically limited, and may be, for example, resins for forming a coating film, curing agents for the resin, pigments and dyes, diluting solvents, surfactants, modifiers, and the like. Further, if necessary, various additives such as curing catalysts, sensitizers, defoamers, viscosity modifiers, dispersants, leveling agents, flame retardants, adhesion improving agents, colorants, antistatic agents, antioxidants, photostabilizers, release agents, and coupling agents may also be contained as coating components.

The resins contained in the water-based coating composition may be, for example, acrylic resins, alkyd resins, polyester resins, urethane resins, epoxy resins, amino resins, or the like. Examples of such resins include resins that cure with chemical reaction in the presence or absence of a catalyst, such as thermosetting type, UV-curable type, EB(electron beam)-curable type, oxidative curable type, photocationic curable type, peroxide curable type, and acid/epoxy curable type, or resins having high glass transition point and forming a film only by volatilizing a diluting solvent without involving chemical reactions. Further, examples of the curing agents include amino resins, melamine resins, isocyanate compounds, block isocyanate compounds, and epoxy compounds.

Examples of the pigments and dyes include coloring pigments such as titanium dioxide, carbon black, chrome yellow, cadmium yellow, ocher, titanium yellow, zinc chromate, iron oxide red, aluminosilicate, quinacridone pigments, phthalocyanine pigments, anthraquinone pigments, diketopyrrolopyrrole pigments, benzimidazolone pigments, and isoindolinone pigments; metallic pigments such as aluminum flakes, copper flakes, micaceous iron oxide, mica, and scaly powder of mica coated with metal oxide; and extender pigments such as calcium carbonate, barium sulfate, silicon dioxide, aluminum hydroxide, talc, organic fibers, and glass powders.

The water-based coating composition of the present invention can contain other substances within a range that does not impair the characteristics thereof and purposes of the present invention. Examples of such substances include surfactants, film-forming aids, dryers, anti-fouling agents, thickeners, antioxidants, UV absorbers, water resistant agents, antiseptic and antifungal agents, defoamers, leveling agents, dispersants, flame retardants, adhesion improving agents, colorants, antistatic agents, release agents, coupling agents, deodorants, fragrances, dyes, and other additives.

(Method for Preparing Water-Based Coating Composition)

The water-based coating composition of the present invention is prepared by, for example, kneading the components such as vehicles and pigments by using a kneader or a roll, and dissolving or dispersing the components in water by using a sand grind mill, a disperser, or the like.

The surface control agent for a water-based coating of the present invention can be added to the water-based coating composition at any timing, for example, during synthesis of resins for forming a coating film, kneading of vehicles, pigments, and the like, or a final stage in preparation of the water-based coating composition.

(Application of Water-Based Coating Composition) The water-based coating composition of the present invention can be used for any application, but is suitable for use in coating of automobile materials, coating of high class furniture, coating of home appliances, and the like, which require excellent appearance and overcoatability.

[Coating Film]

A coating film of the present invention is obtained by curing the water-based coating composition of the present invention described above. Since the water-based coating composition containing the surface control agent of the present invention has improved cissing prevention properties, occurrence of cissing and cratering in the resultant coating film can be prevented even when the water-based coating composition is used for applications that require excellent appearance and overcoatability.

(Method for Forming Coating Film)

The coating film of the present invention is formed by applying the water-based coating composition of the present invention to a substrate as an object to be coated, and then drying and curing the water-based coating composition.

Examples of the object to be coated include, but are not limited to, substrates made of metal, plastic, wood, rubber, glass, stone, cement, mortar, paper, non-woven fabric, cloth, or ceramics. The method of applying the water-based coating composition is not specifically limited, and may be, for example, spray coating, roll coating, brush coating, curtain coating, bar coating, doctor blade, slit coating, dip coating, or flow coating. The method of curing the water-based coating composition is not specifically limited, and may be, for example, room temperature curing, heat curing, or UV curing. Among them, heat curing is particularly suitable.

[Multilayer Coating Film]

A multilayer coating film of the present invention includes the aforementioned coating film, and a topcoat film applied to all or part of a surface of the coating film. Since the water-based coating composition containing the surface control agent of the present invention has improved overcoatability, good interlayer adhesion between a coating film obtained by curing the water-based coating composition and a topcoat film is achieved even when the water-based coating composition is used for applications that require excellent appearance and overcoatability.

(Method for Forming Multilayer Coating Film)

The multilayer coating film of the present invention is formed by, for example, applying a topcoat to all or part of a surface of the coating film obtained by curing a water-based undercoat which contains the surface control agent of the present invention. Alternatively, a topcoat may also be applied by wet-on-wet coating without curing a water-based undercoat which contains the surface control agent of the present invention. Preferably, after the water-based coating which contains the surface control agent of the present invention is applied, natural drying or preheat-drying is applied as necessary to remove unnecessary solvent (volatile components such as water and organic solvent) without curing the water-based undercoat before the topcoat is applied. In particular, preheat-drying is suitable as the method for drying the water-based undercoat.

The methods of applying and curing the topcoat are not specifically limited, and the same methods as those for the water-based coating composition of the present invention can be used.

The preferred embodiments of the present invention have been described above, but the present invention is not limited to the aforementioned embodiments. That is, other embodiments or various modifications that would occur to those skilled in the art within the scope of the appended claims should be construed as being within the technical scope of the present invention.

For example, according to another viewpoint from the aforementioned embodiment, the present invention may also include usage of a copolymer as a surface control agent for a water-based coating, the copolymer containing, as constituent monomers, a dibasic acid ester (A) having a polymerizable unsaturated double bond in an amount of 10% by mass or more and 99% by mass or less, and a polymerizable unsaturated monomer (B) containing an ether group represented by a general formula (1):

$$R^1-(C_mH_{2m}O)_n-R^2 \qquad (1)$$

(where $R^1$ represents a (meth)acryloyl group, a vinyl ether group, or an allyl group, $R^2$ represents a hydrogen atom, a (meth)acryloyl group, a vinyl ether group, an allyl group, or an alkyl group with 1 to 22 carbon atoms, m is a number from 2 to 4, and n is a number from 2 to 100) in an amount of 1% by mass or more and 90% by mass or less, wherein the copolymer has a weight-average molecular weight of 1,000 or more and 100,000 or less.

In the usage of the copolymer as the surface control agent for a water-based coating, the copolymer may contain, as constituent monomers, the dibasic acid ester (A), the polymerizable unsaturated monomer (B), and a copolymerizable unsaturated monomer (C) in an amount of 400 parts by mass or less when a total amount of the dibasic acid ester (A) and the polymerizable unsaturated monomer (B) is 100 parts by mass, and the copolymerizable unsaturated monomer (C) may be a monomer different from the dibasic acid ester (A) and the polymerizable unsaturated monomer (B).

In the usage of the copolymer as the surface control agent for a water-based coating, the dibasic acid ester (A) may be at least one monomer selected from the group consisting of maleic acid diester, maleic acid monoester, fumaric acid diester, fumaric acid monoester, itaconic acid diester, itaconic acid monoester, citraconic acid monoester, citraconic acid diester, mesaconic acid monoester, and mesaconic acid diester.

In the usage of the copolymer as the surface control agent for a water-based coating, $R^2$ in the general formula (1) may be a (meth)acryloyl group, a vinyl ether group, or an allyl group.

In the usage of the copolymer as the surface control agent for a water-based coating, the copolymerizable unsaturated monomer (C) may be at least one monomer selected from the group consisting of an alkyl (meth)acrylate, polymerizable unsaturated monomer having a hydroxyl group, polymerizable unsaturated monomer having an amide group, polymerizable unsaturated monomer having a glycol group, polymerizable unsaturated monomer having a glycidyl group, polymerizable unsaturated monomer having a carboxyl group, multifunctional unsaturated monomer, and a reactive silicone having a methacryloyloxy group.

Further, the present invention may also include usage of the polymer in a water-based coating composition containing a surface control agent for a water-based coating in an amount of 0.1% by mass or more and 10% by mass or less when a total resin solid content is 100% by mass.

Further, the present invention may also include usage of the polymer in a coating film obtained by curing the aforementioned water-based coating composition.

Further, the present invention may also include usage of the polymer in a multilayer coating film including: the aforementioned coating film; and a topcoat film applied to all or part of a surface of the coating film.

EXAMPLES

The present invention will be specifically described below by using examples. Further, the present invention is not limited to these examples in any way. In the examples, "%" and "parts" indicate "% by mass" and "parts by mass," respectively, unless otherwise specified.

[Preparation of Surface Conditioner]

First, Preparation Examples 1 to 31 and Comparative Preparation Examples 1 to 4 were conducted as described below to obtain surface control agents [1] to [31] and comparative additives [H1] to [H4], respectively.

Preparation Example 1

Ethylene glycol monobutyl ether in an amount of 100 parts was provided as a solvent (a-1) in a 500 ml reaction vessel provided with a stirrer, a reflux condenser, a dropping pump, a thermometer, and a nitrogen introduction pipe. Then, while stirring under a nitrogen gas stream, the internal temperature of the reaction vessel was raised to 120° C. A mixed solution was prepared as a dropping solution (b-1) by mixing 120 parts of diisobutyl fumarate, 15 parts of methoxypolyethylene glycol acrylate (trade name: BLEMMER AME-400: manufactured by NOF Corporation), 15 parts of polyethylene glycol diacrylate (trade name: MIRAMER M280: manufactured by Miwon Specialty Chemical Co., Ltd.), and 9 parts of a 50% solution of tert-amyl peroxy-2-ethylhexanoate. Then, while keeping the internal temperature of the reaction vessel at 120° C., the above dropping solution (b-1) was uniformly added dropwise to the solvent (a-1) over 60 minutes. After completion of the dropwise addition, the reaction temperature was maintained at 120° C. for 60 minutes, and then adjusted to 100° C. When the internal temperature of the reaction vessel became 100° C., 3 parts of a 50% solution of tert-amyl peroxy-2-ethylhexanoate was added, and the reaction temperature was maintained at 100° C. for 120 minutes to perform the polymerization reaction. After completion of the polymerization reaction, the solid content was adjusted to 40% by using ethylene glycol monobutyl ether as a solvent to thereby obtain a surface control agent [1]. The weight-average molecular weight of the synthesized copolymer was 2,000. The weight-average molecular weight was a value calculated based on a molecular weight of polystyrene as a standard in a chromatogram measured by GPC as described above (The same applies to the surface control agents [2] to [31] and comparative additives [H1] to [H3]).

Preparation Example 2

A surface control agent [2] was obtained in the same manner as in Preparation Example 1 except that 100 parts of propylene glycol 1-monomethyl ether 2-acetate was used as a solvent (a-2) instead of the solvent (a-1) of Preparation Example 1, and a mixed solution obtained by mixing 90 parts of dibutyl itaconate, 60 parts of methoxy polyethylene glycol methacrylate (trade name: NK ester M-90G: manufactured by Shin-Nakamura Chemical Co., Ltd.), and 9 parts of a 50% solution of tert-amyl peroxy-2-ethylhexanoate was used as a dropping solution (b-2) instead of the dropping solution (b-1). The weight-average molecular weight of the synthesized copolymer was 4,200.

Preparation Example 3

A surface control agent [3] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 45 parts of dibutyl fumarate, 45 parts of di(2-ethylhexyl) fumarate, 30 parts of methoxy polyethylene glycol methacrylate (trade name: NK ester M-40G: manufactured by Shin-Nakamura Chemical Co., Ltd.), 30 parts of polyethylene glycol diacrylate (trade name: MIRAMER M280: manufactured by Miwon Specialty Chemical Co., Ltd.), and 9 parts of a 50% solution of tert-amyl peroxy-2-ethylhexanoate was used as a dropping solution (b-3) instead of the dropping solution (b-1). The weight-average molecular weight of the synthesized copolymer was 35,000.

Preparation Example 4

A surface control agent [4] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 45 parts of dibutyl fumarate, 45 parts of di(2-ethylhexyl) fumarate, 60 parts of methoxy polyethylene glycol methacrylate (trade name: NK ester M-40G: manufactured by Shin-Nakamura Chemical Co., Ltd.), and 9 parts of a 50% solution of tert-amyl peroxy-2-ethylhexanoate was used as a dropping solution (b-4) instead of the dropping solution (b-1). The weight-average molecular weight of the synthesized copolymer was 4,200.

Preparation Example 5

A surface control agent [5] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 30 parts of mono(2-ethylhexyl) maleate, 117 parts of diisobutyl fumarate, 3 parts of methoxy polyethylene glycol acrylate (trade name: BLEMMER AME-400: manufactured by NOF Corporation), and 9 parts of a 50% solution of tert-amyl peroxy-2-ethylhexanoate was used as a dropping solution (b-5) instead of the dropping solution (b-1). The weight-average molecular weight of the synthesized copolymer was 1,200.

Preparation Example 6

A surface control agent [6] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 15 parts of mono(2-ethylhexyl) maleate, 105 parts of di(2-ethylhexyl) fumarate, 30 parts of polypropylene glycol dimethacrylate (trade name: BLEMMER PDP-400N: manufactured by NOF Corporation), and 9 parts of a 50% solution of tert-amyl peroxy-2-ethylhexanoate was used as a dropping solution (b-6) instead of the dropping solution (b-1). The weight-average molecular weight of the synthesized copolymer was 4,800.

Preparation Example 7

A surface control agent [7] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 120 parts of dibutyl itaconate, 30 parts of polypropylene glycol dimethacrylate (trade name: BLEMMER PDP-400N: manufactured by NOF Corporation), and 18 parts of a 50% solution of tert-amyl peroxy-2-ethylhexanoate was used as a dropping solution (b-7) instead of the dropping solution (b-1). The weight-average molecular weight of the synthesized copolymer was 8,000.

Preparation Example 8

A surface control agent [8] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 105 parts of diethyl fumarate, 45 parts of methoxy polyethylene glycol methacrylate (trade name: NK ester M-40G: manufactured by Shin-Nakamura Chemical Co., Ltd.), and 9 parts of a 50% solution of tert-amyl peroxy-2-ethylhexanoate was used as a dropping solution (b-8) instead of the dropping solution (b-1). The weight-average molecular weight of the synthesized copolymer was 3,200.

Preparation Example 9

A surface control agent [9] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 97.5 parts of diisobutyl fumarate, 52.5 parts of polyethylene glycol diacrylate (trade name: MIRAMER M280: manufactured by Miwon Specialty Chemical Co., Ltd.), and 27 parts of a 50% solution of tert-amyl peroxy-2-ethylhexanoate was used as a dropping solution (b-9) instead of the dropping solution (b-1). The weight-average molecular weight of the synthesized copolymer was 7,400.

Preparation Example 10

A surface control agent [10] was obtained in the same manner as in Preparation Example 1 except that 150 parts of propylene glycol 1-monomethyl ether 2-acetate was used as the solvent (a-2) instead of the solvent (a-1) of Preparation Example 1, and a mixed solution obtained by mixing 22.5 parts of dibutyl fumarate, 127.5 parts of polypropylene glycol dimethacrylate (trade name: BLEMMER PDP-400N: manufactured by NOF Corporation), and 85 parts of a 55% solution of 2,2-di(tert-amyl peroxy)butane was used as a dropping solution (b-10) instead of the dropping solution (b-1), and the reaction temperature was set at 140° C. The weight-average molecular weight of the synthesized copolymer was 8,800.

Preparation Example 11

A surface control agent [11] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 120 parts of diisobutyl fumarate, 30 parts of polyethylene glycol diacrylate (trade name: MIRAMER M280: manufactured by Miwon Specialty Chemical Co., Ltd.), and 4 parts of a 50% solution of tert-amyl peroxy-2-ethylhexanoate was used as a dropping solution (b-11) instead of the dropping solution (b-1). The weight-average molecular weight of the synthesized copolymer was 11,000.

Preparation Example 12

A surface control agent [12] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 120 parts of diisobutyl fumarate, 30 parts of polyethylene glycol diacrylate (trade name: MIRAMER M280: manufactured by Miwon Specialty Chemical Co., Ltd.), and 3 parts of a 40% solution of tert-butyl peroxy-2-ethylhexanoate was used as a dropping solution (b-12) instead of the dropping solution (b-1), and the reaction temperature was set at 100° C. The weight-average molecular weight of the synthesized copolymer was 66,000.

Preparation Example 13

A surface control agent [13] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 30 parts of di(2-ethylhexyl) fumarate, 30 parts of methoxy polyethylene glycol acrylate (trade name: NK ester AM-230G: manufactured by Shin-Nakamura Chemical Co., Ltd.), 90 parts of polypropylene glycol dimethacrylate (trade name: BLEMMER PDP-400N: manufactured by NOF Corporation), 50 parts of propylene glycol 1-monomethyl ether 2-acetate, and 60 parts of a 50% solution of tert-amyl peroxy-2-ethylhexanoate was used as a dropping solution (b-13) instead of the dropping solution (b-1). The weight-average molecular weight of the synthesized copolymer was 23,000.

Preparation Example 14

A surface control agent [14] was obtained in the same manner as in Preparation Example 1 except that 175 parts of propylene glycol 1-monomethyl ether 2-acetate was used as the solvent (a-2) instead of the solvent (a-1) of Preparation Example 1, and a mixed solution obtained by mixing 45 parts of dibutyl fumarate, 30 parts of polyethylene glycol diacrylate (trade name: MIRAMER M280: manufactured by Miwon Specialty Chemical Co., Ltd.), 75 parts of 2-ethylhexyl methacrylate, and 25.5 parts of a 50% solution of tert-amyl peroxy-2-ethylhexanoate was used as a dropping solution (b-14) instead of the dropping solution (b-1). The weight-average molecular weight of the synthesized copolymer was 10,000.

Preparation Example 15

A surface control agent [15] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 60 parts of dibutyl itaconate, 40 parts of polyethylene glycol diacrylate (trade name: MIRAMER M280: manufactured by Miwon Specialty Chemical Co., Ltd.), 50 parts of ethyl acrylate, and 30 parts of a 50% solution of tert-amyl peroxy-2-ethylhexanoate was used as a dropping solution (b-15) instead of the dropping solution (b-1). The weight-average molecular weight of the synthesized copolymer was 6,500.

Preparation Example 16

A surface control agent [16] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 97 parts of diethyl fumarate, 3 parts of polyethylene glycol diacrylate (trade name: MIRAMER M280: manufactured by Miwon Specialty Chemical Co., Ltd.), 50 parts of ethyl acrylate, and 4 parts of a 50% solution of tert-amyl peroxy-2-ethylhexanoate was used as a dropping solution (b-16) instead of the dropping solution (b-1), and the reaction temperature was set at 110° C. The weight-average molecular weight of the synthesized copolymer was 8,000.

Preparation Example 17

A surface control agent [17] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 76.3 parts of diethyl fumarate, 50.8 parts of methoxy polyethylene glycol acrylate (trade name: BLEMMER AME-400: manufactured by NOF Corporation), 22.9 parts of ethyl acrylate, and 6 parts of a 50% solution of tert-amyl peroxy-2-ethylhexanoate was used as a dropping solution (b-17) instead of the dropping solution (b-1), and the reaction temperature was set at 110° C. The weight-average molecular weight of the synthesized copolymer was 7,200.

Preparation Example 18

A surface control agent [18] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 27 parts of dimethyl maleate, 52.5 parts of polyethylene glycol diacrylate (trade name: MIRAMER M280: manufactured by Miwon Specialty Chemical Co., Ltd.), 70.5 parts of ethyl acrylate, and 47 parts of a 50% solution of tert-amyl peroxy-2-ethylhexanoate was used as a dropping solution (b-18) instead of the dropping solution (b-1). The weight-average molecular weight of the synthesized copolymer was 8,700.

Preparation Example 19

A surface control agent [19] was obtained in the same manner as in Preparation Example 1 except that 150 parts of propylene glycol 1-monomethyl ether 2-acetate was used as the solvent (a-2) instead of the solvent (a-1) of Preparation Example 1, and a mixed solution obtained by mixing 45 parts of dibutyl fumarate, 30 parts of polyethylene glycol diacrylate (trade name: MIRAMER M280: manufactured by Miwon Specialty Chemical Co., Ltd.), 75 parts of 2-ethylhexyl methacrylate, and 30 parts of a 50% solution of tert-amyl peroxy-2-ethylhexanoate was used as a dropping solution (b-19) instead of the dropping solution (b-1). The weight-average molecular weight of the synthesized copolymer was 28,000.

Preparation Example 20

A surface control agent [20] was obtained in the same manner as in Preparation Example 1 except that 150 parts of propylene glycol 1-monomethyl ether 2-acetate was used as the solvent (a-2) instead of the solvent (a-1) of Preparation Example 1, and a mixed solution obtained by mixing 45 parts of diethyl fumarate, 45 parts of polypropylene glycol dimethacrylate (trade name: BLEMMER PDP-400N: manufactured by NOF Corporation), 60 parts of ethyl methacrylate, and 20 parts of a 50% solution of tert-amyl peroxy-2-ethylhexanoate was used as a dropping solution (b-20) instead of the dropping solution (b-1). The weight-average molecular weight of the synthesized copolymer was 62,000.

Preparation Example 21

A surface control agent [21] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 78 parts of dibutyl maleate, 45 parts of methoxy polyethylene glycol methacrylate (trade name: NK ester M-90G: manufactured by Shin-Nakamura Chemical Co., Ltd.), 27 parts of 2-ethylhexyl acrylate, and 9 parts of a 50% solution of tert-amyl peroxy-2-ethylhexanoate was used as a dropping solution (b-21) instead of the dropping solution (b-1). The weight-average molecular weight of the synthesized copolymer was 11,000.

Preparation Example 22

A surface control agent [22] was obtained in the same manner as in Preparation Example 1 except that 100 parts of ethylene glycol monobutyl ether was used as the solvent (a-1) of Preparation Example 1, and a mixed solution obtained by mixing 114 parts of dibutyl fumarate, 7.5 parts of methoxy polyethylene glycol acrylate (trade name: BLEMMER AME-400: manufactured by NOF Corporation), 28.5 parts of ethyl acrylate, and 9 parts of a 50% solution of tert-amyl peroxy-2-ethylhexanoate was used as a dropping solution (b-22) instead of the dropping solution (b-1). The weight-average molecular weight of the synthesized copolymer was 1,900.

Preparation Example 23

A surface control agent [23] was obtained in the same manner as in Preparation Example 1 except that a mixed solution obtained by mixing 78 parts of di(2-ethylhexyl) maleate, 45 parts of methoxy polyethylene glycol acrylate (trade name: BLEMMER AME-400: manufactured by NOF Corporation), 15 parts of isobutyl acrylate, 12 parts of 2-ethyl methacrylate, and 9 parts of a 50% solution of tert-amyl peroxy-2-ethylhexanoate was used as a dropping solution (b-23) instead of the dropping solution (b-1). The weight-average molecular weight of the synthesized copolymer was 4,400.

Preparation Example 24

A surface control agent [24] was obtained in the same manner as in Preparation Example 1 except that 100 parts of propylene glycol 1-monomethyl ether 2-acetate was used as the solvent (a-2) instead of the solvent (a-1) of Preparation Example 1, and a mixed solution obtained by mixing 52.5 parts of dibutyl itaconate, 30 parts of di(2-ethylhexyl) itaconate, 45 parts of methoxy polyethylene glycol acrylate (trade name: BLEMMER AME-400: manufactured by NOF Corporation), 22.5 parts of butyl methacrylate, and 9 parts of a 50% solution of tert-amyl peroxy-2-ethylhexanoate was used as a dropping solution (b-24) instead of the dropping solution (b-1). The weight-average molecular weight of the synthesized copolymer was 2,900.

Preparation Example 25

A surface control agent [25] was obtained in the same manner as in Preparation Example 1 except that a mixed solution obtained by mixing 78 parts of dibutyl itaconate, 30 parts of methoxy polyethylene glycol acrylate (trade name: NK ester AM-230G: manufactured by Shin-Nakamura Chemical Co., Ltd.), 15 parts of polyethylene glycol monoallyl ether (trade name: UNIOX PKA-5003: manufactured by NOF Corporation), 27 parts of butyl methacrylate, 47 parts of ethylene glycol monobutyl ether, and 9 parts of a 50% solution of tert-amyl peroxy-2-ethylhexanoate was used as a dropping solution (b-25) instead of the dropping solution (b-1). The weight-average molecular weight of the synthesized copolymer was 3,400.

Preparation Example 26

A surface control agent [26] was obtained in the same manner as in Preparation Example 1 except that 150 parts of propylene glycol 1-monomethyl ether 2-acetate was used as the solvent (a-2) instead of the solvent (a-1) of Preparation Example 1, and a mixed solution obtained by mixing 15 parts of diethyl fumarate, 15 parts of di(2-ethylhexyl) fumarate, 45 parts of di(2-ethylhexyl) itaconate, 15 parts of polyethylene glycol diacrylate (trade name: MIRAMER M280: manufactured by Miwon Specialty Chemical Co., Ltd.), 30 parts of ethyl acrylate, 30 parts of butyl acrylate, and 30 parts of a 50% solution of tert-amyl peroxy-2-ethylhexanoate was used as a dropping solution (b-26) instead of the dropping solution (b-1). The weight-average molecular weight of the synthesized copolymer was 3,700.

Preparation Example 27

A surface control agent [27] was obtained in the same manner as in Preparation Example 1 except that 120 parts of propylene glycol 1-monomethyl ether 2-acetate was used as the solvent (a-2) instead of the solvent (a-1) of Preparation Example 1, and a mixed solution obtained by mixing 45 parts of dibutyl fumarate, 15 parts of monobutyl fumarate, 4.5 parts of methoxy polyethylene glycol acrylate (trade name: BLEMMER AME-400: manufactured by NOF Corporation), 70.5 parts of butyl acrylate, 7.5 parts of 2-hydroxyethyl methacrylate, 7.5 parts of acrylic acid, and 9 parts of a 50% solution of tert-amyl peroxy-2-ethylhexanoate was used as a dropping solution (b-27) instead of the dropping solution (b-1). The weight-average molecular weight of the synthesized copolymer was 4,800.

Preparation Example 28

A surface control agent [28] was obtained in the same manner as in Preparation Example 1 except that 150 parts of propylene glycol 1-monomethyl ether 2-acetate was used as the solvent (a-2) instead of the solvent (a-1) of Preparation Example 1, and a mixed solution obtained by mixing 15 parts of di(2-ethylhexyl) fumarate, 15 parts of polyethylene glycol diacrylate (trade name: MIRAMER M280: manufactured by Miwon Specialty Chemical Co., Ltd.), 7.5 parts of polypropylene glycol dimethacrylate (trade name: BLEMMER PDP-400N: manufactured by NOF Corporation), 60 parts of ethyl acrylate, 52.5 parts of 2-ethylhexyl acrylate, and 27 parts of a 50% solution of tert-amyl peroxy-2-ethylhexanoate was used as a dropping solution (b-28) instead of the dropping solution (b-1). The weight-average molecular weight of the synthesized copolymer was 7,000.

Preparation Example 29

A surface control agent [29] was obtained in the same manner as in Preparation Example 1 except that 120 parts of propylene glycol 1-monomethyl ether 2-acetate was used as the solvent (a-2) instead of the solvent (a-1) of Preparation Example 1, and a mixed solution obtained by mixing 45 parts of dibutyl fumarate, 6 parts of methoxy polyethylene glycol acrylate (trade name: BLEMMER AME-400: manufactured by NOF Corporation), 7.5 parts of polyethylene glycol diacrylate (trade name: MIRAMER M280: manufactured by Miwon Specialty Chemical Co., Ltd.), 91.5 parts of ethyl acrylate, and 15 parts of a 50% solution of tert-amyl peroxy-2-ethylhexanoate was used as a dropping solution (b-29) instead of the dropping solution (b-1). The weight-average molecular weight of the synthesized copolymer was 8,300.

Preparation Example 30

A surface control agent [30] was obtained in the same manner as in Preparation Example 1 except that 150 parts of propylene glycol 1-monomethyl ether 2-acetate was used as the solvent (a-2) instead of the solvent (a-1) of Preparation Example 1, and a mixed solution obtained by mixing 15 parts of dimethyl maleate, 24 parts of diisopropyl fumarate, 6 parts of methoxy polyethylene glycol methacrylate (trade name: NK ester M-90G: manufactured by Shin-Nakamura Chemical Co., Ltd.), 45 parts of polyethylene glycol diacrylate (trade name: MIRAMER M280: manufactured by Miwon Specialty Chemical Co., Ltd.), 60 parts of 2-ethylhexyl methacrylate, and 22.5 parts of a 50% solution of tert-amyl peroxy-2-ethylhexanoate was used as a dropping solution (b-30) instead of the dropping solution (b-1). The weight-average molecular weight of the synthesized copolymer was 110,000.

Preparation Example 31

A surface control agent [31] was obtained in the same manner as in Preparation Example 1 except that 150 parts of propylene glycol 1-monomethyl ether 2-acetate was used as the solvent (a-2) instead of the solvent (a-1) of Preparation Example 1, and a mixed solution obtained by mixing 45 parts of dibutyl fumarate, 30 parts of polyethylene glycol diacrylate (trade name: MIRAMER M280: manufactured by Miwon Specialty Chemical Co., Ltd.), 75 parts of 2-ethylhexyl methacrylate, and 15 parts of a 50% solution of tert-amyl peroxy-2-ethylhexanoate was used as a dropping solution (b-31) instead of the dropping solution (b-1). The weight-average molecular weight of the synthesized copolymer was 59,000.

Comparative Preparation Example 1

Propylene glycol 1-monomethyl ether 2-acetate in an amount of 120 parts was provided as a solvent in a 500 ml reaction vessel provided with a stirrer, a reflux condenser, a dropping pump, a thermometer, and a nitrogen introduction pipe. Then, while stirring under a nitrogen gas stream, the internal temperature of the reaction vessel was raised to 120° C. A mixed solution was prepared as a dropping solution by mixing 7.5 parts of dibutyl fumarate, 142.5 parts of methoxypolyethylene glycol acrylate (trade name: BLEMMER AME-400: manufactured by NOF Corporation), and 9 parts of a 50% solution of tert-amyl peroxy-2-ethylhexanoate. Then, while keeping the internal temperature of the reaction vessel at 120° C., the above dropping solution was uniformly added dropwise to the solvent over 60 minutes. After completion of the dropwise addition, the reaction temperature was maintained at 120° C. for 60 minutes, and then adjusted to 100° C. When the internal temperature of the reaction vessel became 100° C., 3 parts of a 50% solution of tert-amyl peroxy-2-ethylhexanoate was added, and the reaction temperature was maintained at 100° C. for 120 minutes to perform the polymerization reaction. After completion of the polymerization reaction, the solid content was adjusted to 40% by using propylene glycol 1-monomethyl ether 2-acetate as a solvent to thereby obtain a comparative additive [H1]. The weight-average molecular weight of the synthesized copolymer was 5,500.

Comparative Preparation Example 2

Propylene glycol 1-monomethyl ether 2-acetate in an amount of 160 parts was provided as a solvent in a 500 ml reaction vessel provided with a stirrer, a reflux condenser, a dropping pump, a thermometer, and a nitrogen introduction pipe. Then, while stirring under a nitrogen gas stream, the internal temperature of the reaction vessel was raised to 100° C. A mixed solution was prepared as a dropping solution by mixing 198 parts of dodecyl methacrylate, 85 parts of methoxy polyethylene glycol methacrylate (trade name: NK ester M-90G: manufactured by Shin-Nakamura Chemical Co., Ltd.), and 5.1 parts of a 40% solution of tert-butyl peroxy-2-ethylhexanoate. Then, while keeping the internal temperature of the reaction vessel at 100° C., the above dropping solution was uniformly added dropwise to the solvent over 90 minutes. After completion of the dropping, the reaction temperature was maintained at 100° C. for 60 minutes. Then, 1.8 parts of a 40% solution of tert-butyl peroxy-2-ethylhexanoate was added, and the reaction temperature was maintained at 100° C. for 90 minutes to perform the polymerization reaction. After completion of the polymerization reaction, the solid content was adjusted to 40% by using propylene glycol 1-monomethyl ether 2-acetate as a solvent to thereby obtain a comparative additive [H2]. The weight-average molecular weight of the synthesized copolymer was 75,000.

Comparative Preparation Example 3

Propylene glycol 1-monomethyl ether 2-acetate in an amount of 170 parts was provided as a solvent in a 500 ml reaction vessel provided with a stirrer, a reflux condenser, a dropping pump, a thermometer, and a nitrogen introduction pipe. Then, while stirring under a nitrogen gas stream, the internal temperature of the reaction vessel was raised to 90° C. A mixed solution was prepared as a dropping solution by mixing 280 parts of dodecyl methacrylate, 120 parts of methoxy polyethylene glycol methacrylate (trade name: NK ester M-90G: manufactured by Shin-Nakamura Chemical Co., Ltd.), 43 parts of propylene glycol 1-monomethyl ether 2-acetate, and 8 parts of a 25% solution of diisononanoyl peroxide. Then, while keeping the internal temperature of the reaction vessel at 90° C., the above dropping solution was uniformly added dropwise to the solvent over 90 minutes. After completion of the dropping, the reaction temperature was maintained at 90° C. for 60 minutes. Then, 2.4 parts of a 25% solution of diisononanoyl peroxide was added, and the reaction temperature was maintained at 90° C. for 90 minutes to perform the polymerization reaction. After completion of the polymerization reaction, the solid content was adjusted to 40% by using propylene glycol 1-monomethyl ether 2-acetate as a solvent to thereby obtain a comparative additive [H3]. The weight-average molecular weight of the synthesized copolymer was 170,000.

Comparative Preparation Example 4

Modified silicone (trade name: DISPARLON LS-430, manufactured by Kusumoto Chemicals, Ltd.) was used as a comparative additive [H4].

Table 1 shows the monomer ratio (% by mass) and the weight-average molecular weight (Mw) of copolymers synthesized in Preparation Examples 1 to 31 and Comparative Preparation Examples 1 to 3, and the surface control agent used in Comparative Preparation Example 4.

TABLE 1

Monomer ratio and weight-average molecular weight of polymers (Part 1)

| | | | | | | | Surface control agent | | | | | | |
|---|---|---|---|---|---|---|---|---|---|---|---|---|---|
| | | | | | | 1 | 2 | 3 | 4 | 5 | 6 | 7 | 8 | 9 | 10 |
| Dibasic acid ester (A) | Dimethyl maleate | | | | | | | | | | | | | | |
| | Dibutyl maleate | | | | | | | | | | | | | | |
| | Di(2-ethylhexyl) maleate | | | | | | | | | | | | | | |
| | Mono(2-ethylhexyl) maleate | | | | | | | | | | | 20 | 10 | | | |
| | Diethyl fumarate | | | | | | | | | | | | | | 70 | |
| | Diisopropyl fumarate | | | | | | | | | | | | | | | |
| | Dibutyl fumarate | | | | | | | | | | 30 | 30 | | | | | 15 |
| | Diisobutyl fumarate | | | | | | 80 | | | | | 78 | | | 65 | |
| | Di(2-ethylhexyl) fumarate | | | | | | | | | 30 | 30 | | 70 | | | |
| | Monobutyl fumarate | | | | | | | | | | | | | | | |
| | Dibutyl itaconate | | | | | | | | 60 | | | | | 80 | | |
| | Di(2-ethylhexyl) itaconate | | | | | | | | | | | | | | | |
| Polymerizable | | R1 | m | n | R2 | | | | | | | | | | |
| unsaturated monomer (B) | NK ester M-40G | Methacryl | 2 | 4 | CH3 | | | | | 20 | 40 | | | 30 | |
| | NK ester M-90G | Methacryl | 2 | 9 | CH3 | | 40 | | | | | | | | |
| | BLEMMER AME-400 | Acryl | 2 | 9 | CH3 | 10 | | | | | 2 | | | | |
| | NK ester AM-230G | Acryl | 2 | 23 | CH3 | | | | | | | | | | |
| | MIRAMER M280 | Acryl | 2 | 9 | Acryl | 10 | | | 20 | | | | | 35 | |
| | BLEMMER PDP-400N | Methacryl | 3 | 9 | Methacryl | | | | | | 20 | 20 | | | 85 |
| | Uniiox PK A-5003 | Allyl | 2 | 9 | H | | | | | | | | | | |
| | Total of A + B (parts) | | | | | 100 | 100 | 100 | 100 | 100 | 100 | 100 | 100 | 100 | 100 |
| Co-polymerizable unsaturated monomer (C) | Ethyl acrylate | | | | | | | | | | | | | | |
| | Butyl acrylate | | | | | | | | | | | | | | |
| | Isobutyl acrylate | | | | | | | | | | | | | | |
| | 2-ethylhexyl acrylate | | | | | | | | | | | | | | |
| | Ethyl methacrylate | | | | | | | | | | | | | | |
| | Butyl methacrylate | | | | | | | | | | | | | | |
| | 2-ethylhexyl methacrylate | | | | | | | | | | | | | | |
| | Dodecyl methacrylate | | | | | | | | | | | | | | |
| | Dimethylaminoethyl methacrylate | | | | | | | | | | | | | | |
| | 2-hydroxy ethyl methacrylate | | | | | | | | | | | | | | |
| | Acrylic acid | | | | | | | | | | | | | | |
| | Total of A + B + C (parts) | | | | | 100 | 100 | 100 | 100 | 100 | 100 | 100 | 100 | 100 | 100 |
| | Weight-average molecular weight (MW) | | | | | 2000 | 4200 | 35000 | 4200 | 1200 | 4800 | 8000 | 3200 | 7400 | 8800 |

| | | | | | | Surface control agent | | | | | | | | |
|---|---|---|---|---|---|---|---|---|---|---|---|---|---|---|
| | | | | | | 11 | 12 | 13 | 14 | 15 | 16 | 17 | 18 | 19 | 20 |
| Dibasic acid ester (A) | Dimethyl maleate | | | | | | | | | | | | 34 | | |
| | Dibutyl maleate | | | | | | | | | | | | | | |
| | Di(2-ethylhexyl) maleate | | | | | | | | | | | | | | |
| | Mono(2-ethylhexyl) maleate | | | | | | | | | | | | | | |
| | Diethyl fumarate | | | | | | | | | | | | 97 | 60 | | 50 |
| | Diisopropyl fumarate | | | | | | | | | | | | | | |
| | Dibutyl fumarate | | | | | | | | | 60 | | | | | 60 | |
| | Diisobutyl fumarate | | | | | 80 | 80 | | | | | | | | |
| | Di(2-ethylhexyl) fumarate | | | | | | | 20 | | | | | | | |
| | Monobutyl fumarate | | | | | | | | | | | | | | |
| | Dibutyl itaconate | | | | | | | | | | 60 | | | | |
| | Di(2-ethylhexyl) itaconate | | | | | | | | | | | | | | |
| Polymerizable | | R1 | m | n | R2 | | | | | | | | | | |
| unsaturated monomer (B) | NK ester M-40G | Methacryl | 2 | 4 | CH3 | | | | | | | | | | |
| | NK ester M-90G | Methacryl | 2 | 9 | CH3 | | | | | | | | | | |
| | BLEMMER AME-400 | Acryl | 2 | 9 | CH3 | | | | | | | | | 40 | |
| | NK ester AM-230G | Acryl | 2 | 23 | CH3 | | | | | 20 | | | | | |

TABLE 1-continued

Monomer ratio and weight-average molecular weight of polymers (Part 1)

|  |  |  |  |  |  |  |  |  |  |  |  |  |  |  |
|---|---|---|---|---|---|---|---|---|---|---|---|---|---|---|
|  | MIRAMER M280 | Acryl | 2 | 9 | Acryl | 20 | 20 |  | 40 | 40 | 3 |  | 66 | 40 |  |
|  | BLEMMER PDP-400N | Methacryl | 3 | 9 | Methacryl |  |  | 60 |  |  |  |  |  |  | 50 |
|  | Uniiox PK A-5003 | Allyl | 2 | 9 | H |  |  |  |  |  |  |  |  |  |  |
| Co-polymerizable unsaturated monomer (C) | Total of A + B (parts) |  |  |  |  | 100 | 100 | 100 | 100 | 100 | 100 | 100 | 100 | 100 | 100 |
|  | Ethyl acrylate |  |  |  |  |  |  |  |  | 50 | 50 | 18 | 89 |  |  |
|  | Butyl acrylate |  |  |  |  |  |  |  |  |  |  |  |  |  |  |
|  | Isobutyl acrylate |  |  |  |  |  |  |  |  |  |  |  |  |  |  |
|  | 2-ethylhexyl acrylate |  |  |  |  |  |  |  |  |  |  |  |  |  |  |
|  | Ethyl methacrylate |  |  |  |  |  |  |  |  |  |  |  |  |  |  | 67 |
|  | Butyl methacrylate |  |  |  |  |  |  |  |  |  |  |  |  |  |  |
|  | 2-ethylhexyl methacrylate |  |  |  |  |  |  | 100 |  |  |  |  | 100 |  |  |
|  | Dodecyl methacrylate |  |  |  |  |  |  |  |  |  |  |  |  |  |  |
|  | Dimethylaminoethyl methacrylate |  |  |  |  |  |  |  |  |  |  |  |  |  |  |
|  | 2-hydroxy ethyl methacrylate |  |  |  |  |  |  |  |  |  |  |  |  |  |  |
|  | Acrylic acid |  |  |  |  |  |  |  |  |  |  |  |  |  |  |
|  | Total of A + B + C (parts) |  |  |  |  | 100 | 100 | 100 | 200 | 150 | 150 | 118 | 189 | 200 | 167 |
|  | Weight-average molecular weight (MW) |  |  |  |  | 11000 | 66000 | 23000 | 10000 | 6500 | 8000 | 7200 | 8700 | 28000 | 62000 |

TABLE 1

Monomer ratio and weight-average molecular weight of polymers (Part 2)

| | | | | | | | | Surface control agent | | | | | | | | Comparative additive | | | |
|---|---|---|---|---|---|---|---|---|---|---|---|---|---|---|---|---|---|---|---|---|
| | | | | | 21 | 22 | 23 | 24 | 25 | 26 | 27 | 28 | 29 | 30 | 31 | H1 | H2 | H3 | H4 |
| Dibasic acid ester (A) | Dimethyl maleate | | | | | 63 | | | | | | | | | | | | | | Silicone based surface control agent LS-430 |
| | Dibutyl maleate | | | | | | | 63 | | | | | | | | | | | | |
| | Di(2-ethylhexyl) maleate | | | | | | | | | | 17 | | | | | | | | | |
| | Mono(2-ethylhexyl) maleate | | | | | | | | | | | | | | | | | | | |
| | Diethyl fumarate | | | | | | 94 | | | | | | | | | | | | | |
| | Diisopropyl fumarate | | | | | | | | | | | | | | | | | | | |
| | Dibutyl fumarate | | | | | | | | | | | 70 | | | | | | | | |
| | Diisobutyl fumarate | | | | | | | | | | 17 | 23 | 40 | 77 | | | | | | |
| | Di(2-ethylhexyl) fumarate | | | | | | | | | | | | | | 17 | 27 | | | | |
| | Monobutyl fumarate | | | | | | | | | | | | | | | 60 | 5 | | | |
| | Dibutyl itaconate | | | | | | | | 41 | 63 | | | | | | | | | | |
| | Di(2-ethylhexyl) itaconate | | | | | | | | 24 | | 49 | | | | | | | | | |
| Polymerizable unsaturated monomer (B) | | R1 | m | n | R2 | | | | | | | | | | | | | | | |
| | NK ester M-40G | Methacryl | 2 | 4 | CH3 | 37 | 6 | 37 | 35 | | 25 | 7 | | 7 | | | | | | |
| | NK ester M-90G | Methacryl | 2 | 9 | CH3 | | | | | | | | | 10 | | | | | | |
| | BLEMMER AME-400 | Acryl | 2 | 9 | CH3 | | | | | | | 17 | | | 13 | 49 | 95 | | | |
| | NK ester AM-230G | Acryl | 2 | 23 | CH3 | | | | | | | | 140 | 40 | | | 40 | | | |
| | MIRAMER M280 | Acryl | 2 | 9 | Acryl | | | | | | | | | 20 | | | | | | |
| | BLEMMER PDP-400N | Methacryl | 3 | 9 | Methacryl | | | | | | | | | | 67 | 100 | | | | |
| | Uniox PKA-5003 | Allyl | 2 | 9 | H | | | | | | 12 | | | | | | | | | |
| | Total of A + B (parts) | | | | | 100 | 100 | 100 | 100 | 100 | 100 | 100 | 100 | 100 | 100 | 100 | 100 | 100 | 100 | |
| Copolymerizable unsaturated monomer (C) | Ethyl acrylate | | | | | 22 | 23 | 23 | 17 | 22 | 33 | 33 | | 160 | 156 | | | | | |
| | Butyl acrylate | | | | | | | 12 | | | | 109 | | | | | | | | |
| | Isobutyl acrylate | | | | | | | 10 | | | | | | | | | | | | |
| | 2-ethylhexyl acrylate | | | | | | | | | | | | | | | | | | | |
| | Ethyl methacrylate | | | | | | | | | | | | | | | | | | | |
| | Butyl methacrylate | | | | | | | | | | | 12 | | | | | 95 | | | |
| | 2-ethylhexyl methacrylate | | | | | | | | | | | 12 | | | | | 40 | | | |
| | Dodecyl methacrylate | | | | | | | | | | | | | | | | | | | |
| | Dimethylaminoethyl methacrylate | | | | | | | | | | | | | | | | | 233 | 233 | |
| | 2-hydroxy ethyl methacrylate | | | | | | | | | | | | | | | | | | | |
| | Acrylic acid | | | | | | | | | | | | | | | | | | | |
| | Total of A + B + C (parts) | | | | | 122 | 123 | 122 | 117 | 122 | 166 | 233 | 400 | 256 | 167 | 200 | 100 | 333 | 333 | 0 |
| | Weight-average molecular weight (MW) | | | | | 11000 | 1900 | 4400 | 2900 | 3400 | 3700 | 4800 | 7000 | 8300 | 11000 | 59000 | 5500 | 7500 | 1700 | — |

[Coating Preparation Examples]

Coatings for performance evaluation (I) were prepared as water-based coatings, which contain the surface control agents and the comparative additives obtained in the above Preparation Examples 1 to 31 and Comparative Preparation Examples 1 to 4. Further, coatings for interlayer adhesion evaluation (II) were prepared as topcoats used for evaluation of interlayer adhesion of the coatings for performance evaluation (I). Hereinafter, preparation methods of the respective coatings will be specifically described.

Examples 1 to 35 and Comparative Examples 1 to 4: Preparation of Coatings for Performance Evaluation (I)

The raw materials listed in Table 2 were sequentially added and mixed by using a laboratory disperser to prepare coatings for performance evaluation (I). The surface control agents [1] to [31] obtained in Preparation Examples 1 to 31 and the comparative additives [H1] to [H4] obtained in Comparative Preparation Examples 1 to 4 in an amount listed in Table 4 (percentage of the solid content in the surface control agent [% by mass] when the resin solid content in the water-based coating is 100% by mass) were added to and dispersed in the coatings for performance evaluation (I) by using a laboratory disperser to thereby obtain water-based coating compositions of Examples 1 to 35 and Comparative Examples 1 to 4.

TABLE 2

Test formulation of coatings

| Raw material | Added amount (parts by mass) | Manufacturer of raw material |
|---|---|---|
| WATERSOL S-727 (Water soluble acrylic resin: resin solid content 60%) | 30.0 | DIC Corporation |
| Deionized water | 15.0 | |
| DISPARLON AQ-530S (Defoamer) | 0.3 | Kusumoto Chemicals, Ltd. |
| CYMEL 327 (Melamine resin: resin solid content 90%) | 8.5 | Allnex Japan Inc. |

(Preparation of Coatings for Interlayer Adhesion Evaluation (II))

Glass beads were added to the compositions of the formulation A described in Table 3 and dispersed by using a sand mill. After the dispersion, the compositions of the formulation B were sequentially added to the compositions of the formulation A, and mixed by using a laboratory disperser to prepare water-based white coating composition. The water-based white coating composition was used as a coating for interlayer adhesion evaluation (II).

TABLE 3

Test formulation of topcoats

| Raw material | Added amount (parts by mass) | Manufacturer of raw material |
|---|---|---|
| Formulation A | | |
| Deionized water | 30.0 | |
| DISPARLON AQ-380 (Dispersant) | 1.0 | Kusumoto Chemicals, Ltd. |

TABLE 3-continued

Test formulation of topcoats

| Raw material | Added amount (parts by mass) | Manufacturer of raw material |
|---|---|---|
| JR-600A (White pigment) | 51.3 | Tayca Corporation |
| Ethylene glycol monobutyl ether (Solvent) | 5.0 | |
| WATERSOL S-727 (Water soluble acrylic resin: resin solid content 60%) | 30.0 | DIC Corporation |
| Formulation B | | |
| DISPARLON AQ-530S (Defoamer) | 0.6 | Kusumoto Chemicals, Ltd. |
| WATERSOL S-727 (Water soluble acrylic resin: resin solid content 60%) | 30.0 | DIC Corporation |
| CYMEL 327(Melamine resin: resin solid content 90%) | 17.0 | Allnex Japan Inc. |

[Evaluation of Water-Based Coating]

The water-based coating compositions of Examples 1 to 35 and Comparative Examples 1 to 4 obtained as described above were applied to a surface of the substrate, and the applied water-based coating compositions were dried and cured to obtain coating films of Examples 1 to 35 and Comparative Examples 1 to 4. For the coating films thus obtained, evaluation of the cissing prevention properties and the coating film appearance was performed as described below. Further, the coatings for interlayer adhesion evaluation (II) as a topcoat were applied to the coating films of Examples 1 to 35 and Comparative Examples 1 to 4, followed by drying and curing, to obtain multilayer coating films of Examples 1 to 35 and Comparative Examples 1 to 4. For these multilayer coating films, evaluation of the interlayer adhesion was performed.

(Evaluation Method for Cissing Prevention Properties)

Four types of substances (A: hand cream, B: vacuum pump oil, C: plasticizer (diisononyl phthalate), and D: sebum) as contaminants causing cissing were applied to a tin plate. The water-based coating compositions of Examples 1 to 35 and Comparative Examples 1 to 4 were each applied to the tin plate (substrate) to which the contaminant causing cissing had been attached at a dry thickness of 40 μm. The water-based coating composition was applied by using a wire coater. The water-based coating composition thus applied was allowed to stand at room temperature for 5 minutes, preheated at 80° C. for 7 minutes, and then baked at 140° C. for 30 minutes to thereby prepare coating films for cissing prevention properties evaluation of Examples 1 to 35 and Comparative Examples 1 to 4.

Evaluation of the cissing prevention properties was performed by visual observation of occurrence of cissing due to contaminants causing cissing, and rated as follows.

Excellent: No cissing was found, and no deterioration in coating film smoothness was found at a site where the contaminant was applied.

Good: No cissing was found, but deterioration in coating film smoothness was found at a site where the contaminant was applied.

Fair: Cissing was found in part of a site where the contaminant was applied.

Poor: Cissing was found across the entire site where the contaminant was applied.

(Evaluation Method for Coating Film Appearance)

The water-based coating compositions of Examples 1 to 35 and Comparative Examples 1 to 4 were applied to a cationic electrodeposition plate (substrate) at a dry thickness of 40 μm. The water-based coating composition was applied by using a wire coater. The water-based coating composition thus applied was allowed to stand at room temperature for 5 minutes, preheated at 80° C. for 7 minutes, and then baked at 140° C. for 30 minutes to thereby prepare coating films for appearance evaluation of Examples 1 to 35 and Comparative Examples 1 to 4. Evaluation of the coating film appearance was performed by visual observation of appearance, smoothness, and crater on a surface of the coating film, and rated as follows.

Excellent: No deterioration in smoothness and no crater were found.

Good: Deterioration in smoothness or occurrence of crater was found in part of the coating film.

Fair: Deterioration in smoothness and occurrence of crater were found in part of the coating film.

Poor: Deterioration in smoothness and occurrence of crater were found across the entire coating film.

(Evaluation Method for Interlayer Adhesion)

The water-based coating compositions of Examples 1 to 35 and Comparative Examples 1 to 4 were applied, as a first layer, to a cationic electrodeposition plate (substrate) at a dry thickness of 40 μm. The water-based coating composition thus applied was allowed to stand at room temperature for 5 minutes, preheated at 80° C. for 7 minutes, and then baked at 140° C. for 30 minutes to thereby prepare coating films of Examples 1 to 35 and Comparative Examples 1 to 4. The coatings for interlayer adhesion evaluation (II) were applied to these coating films, as a second layer, at a dry thickness of 30 μm. The water-based coating composition and the coating for interlayer adhesion evaluation (II) were applied by using a wire coater. The coating (II) thus applied was allowed to stand at room temperature for 5 minutes, preheated at 80° C. for 7 minutes, and then baked at 130° C. for 30 minutes to thereby prepare multilayer coating films of Examples 1 to 35 and Comparative Examples 1 to 4. In accordance with the adhesion test (cross-cut test) specified in JIS K5600-5-6, these multilayer coating films were cut in a square grid pattern at equal intervals of 2 mm in a 20 mm×20 mm square region to form 100 grid squares. Subsequently, a transparent pressure-sensitive adhesion tape was pressed against the grid squares, and then peeled therefrom. Among the 100 grid squares, the number of grid squares in which the first layer and the second layer remain adhered to each other was counted, and the number was used for evaluation of interlayer adhesion.

(Evaluation Results)

Table 4 shows the results of evaluation of cissing prevention properties, coating film appearance, and interlayer adhesion evaluated as described above.

TABLE 4

| | | | Evaluation results | | | | | |
|---|---|---|---|---|---|---|---|---|
| | | Added amount | Cissing prevention properties (Substance causing cissing) | | | | Coating film | Interlayer |
| | Additive | (%) | A | B | C | D | appearance | adhesion |
| | Blank | 0 | Poor | Poor | Poor | Poor | Fair | 100 |
| Example 1 | Surface control agent [1] | 1 | Excellent | Good | Good | Excellent | Excellent | 100 |
| Example 2 | Surface control agent [2] | 1 | Good | Good | Fair | Excellent | Excellent | 100 |
| Example 3 | Surface control agent [3] | 1 | Excellent | Excellent | Excellent | Excellent | Excellent | 90 |
| Example 4 | Surface control agent [4] | 1 | Excellent | Good | Good | Excellent | Excellent | 100 |
| Example 5 | Surface control agent [5] | 1 | Good | Good | Good | Excellent | Excellent | 100 |
| Example 6 | Surface control agent [6] | 1 | Excellent | Excellent | Excellent | Excellent | Excellent | 100 |
| Example 7 | Surface control agent [7] | 1 | Good | Fair | Fair | Good | Good | 100 |
| Example 8 | Surface control agent [8] | 1 | Good | Fair | Fair | Good | Good | 100 |
| Example 9 | Surface control agent [9] | 1 | Excellent | Good | Good | Excellent | Excellent | 98 |
| Example 10 | Surface control agent [10] | 1 | Good | Fair | Fair | Good | Fair | 95 |
| Example 11 | Surface control agent [11] | 1 | Excellent | Good | Good | Excellent | Good | 95 |
| Example 12 | Surface control agent [12] | 1 | Good | Fair | Fair | Good | Fair | 80 |
| Example 13 | Surface control agent [13] | 1 | Excellent | Good | Good | Excellent | Excellent | 100 |
| Example 14 | Surface control agent [14] | 0.1 | Good | Fair | Fair | Good | Good | 100 |
| Example 15 | Surface control agent [14] | 0.5 | Excellent | Excellent | Good | Excellent | Excellent | 100 |
| Example 16 | Surface control agent [14] | 1 | Excellent | Excellent | Excellent | Excellent | Excellent | 100 |
| Example 17 | Surface control agent [14] | 5 | Excellent | Excellent | Excellent | Excellent | Excellent | 100 |
| Example 18 | Surface control agent [14] | 10 | Excellent | Excellent | Excellent | Excellent | Good | 90 |
| Example 19 | Surface control agent [15] | 1 | Good | Fair | Fair | Good | Good | 100 |
| Example 20 | Surface control agent [16] | 1 | Good | Fair | Fair | Good | Good | 100 |
| Example 21 | Surface control agent [17] | 1 | Good | Fair | Fair | Good | Good | 100 |
| Example 22 | Surface control agent [18] | 1 | Good | Fair | Fair | Good | Fair | 95 |
| Example 23 | Surface control agent [19] | 1 | Excellent | Good | Good | Excellent | Good | 90 |
| Example 24 | Surface control agent [20] | 1 | Good | Fair | Fair | Good | Fair | 85 |
| Example 25 | Surface control agent [21] | 1 | Excellent | Excellent | Good | Excellent | Excellent | 100 |
| Example 26 | Surface control agent [22] | 1 | Excellent | Excellent | Good | Excellent | Excellent | 100 |
| Example 27 | Surface control agent [23] | 1 | Excellent | Good | Good | Excellent | Excellent | 100 |
| Example 28 | Surface control agent [24] | 1 | Excellent | Good | Excellent | Excellent | Excellent | 100 |
| Example 29 | Surface control agent [25] | 1 | Excellent | Good | Good | Excellent | Excellent | 100 |
| Example 30 | Surface control agent [26] | 1 | Excellent | Excellent | Good | Excellent | Excellent | 100 |
| Example 31 | Surface control agent [27] | 1 | Excellent | Good | Good | Excellent | Excellent | 80 |
| Example 32 | Surface control agent [28] | 1 | Excellent | Good | Excellent | Excellent | Good | 100 |
| Example 33 | Surface control agent [29] | 1 | Good | Good | Good | Excellent | Excellent | 100 |
| Example 34 | Surface control agent [30] | 1 | Excellent | Excellent | Excellent | Excellent | Fair | 70 |
| Example 35 | Surface control agent [31] | 1 | Excellent | Excellent | Excellent | Excellent | Good | 80 |
| Comparative Example 1 | Comparative additive [H1] | 1 | Fair | Poor | Poor | Fair | Good | 100 |

TABLE 4-continued

| | | Added amount | Cissing prevention properties (Substance causing cissing) | | | | Coating film | Interlayer |
| Additive | | (%) | A | B | C | D | appearance | adhesion |
|---|---|---|---|---|---|---|---|---|
| Comparative Example 2 | Comparative additive [H2] | 1 | Good | Fair | Fair | Good | Poor | 40 |
| Comparative Example 3 | Comparative additive [H3] | 1 | Good | Fair | Fair | Good | Poor | 20 |
| Comparative Example 4 | Comparative additive [H4] | 1 | Excellent | Excellent | Excellent | Excellent | Excellent | 0 |

As seen from Table 4, the coating films and the multilayer coating films obtained by using the water-based coating compositions of Examples 1 to 35 have good cissing prevention properties, coating film appearance, and interlayer adhesion. Accordingly, the water-based coating compositions of Examples 1 to 35 are considered to have both cissing prevention properties and overcoatability. On the other hand, the coating film obtained by using the water-based coating composition of Comparative Example 1, which uses the dibasic acid ester (A) at a monomer ratio out of the range of the present invention, has poorer cissing prevention properties. Further, the coating film and the multilayer coating film obtained by using the water-based coating composition of Comparative Examples 2 and 3, which use methacrylic acid ester instead of the dibasic acid ester (A) as a constituent monomer, have poor coating film appearance and interlayer adhesion, and have the same or poorer cissing prevention properties compared with Examples 1 to 35. Furthermore, the coating film and the multilayer coating film obtained by using the water-based coating composition of Comparative Example 4, which uses a silicone-based surface control agent as an additive, have interlayer adhesion which is significantly lower than that in Examples 1 to 35 when they are used for the application that requires excellent overcoatability (interlayer adhesion).

The invention claimed is:

1. A surface control agent for a water-based coating, the surface control agent comprising: a copolymer containing, as constituent monomers,
a dibasic acid ester (A) having a polymerizable unsaturated double bond in an amount of 10% by mass or more and 99% by mass or less, and
a polymerizable unsaturated monomer (B) containing an ether group represented by a general formula (1):

$$R^1\text{—}(C_mH_{2m}O)_n\text{—}R^2 \quad (1)$$

(where $R^1$ represents a (meth)acryloyl group, a vinyl ether group, or an allyl group, $R^2$ represents a hydrogen atom, a (meth)acryloyl group, a vinyl ether group, an allyl group, or an alkyl group with 1 to 22 carbon atoms, m is a number from 2 to 4, and n is a number from 2 to 100) in an amount of 1% by mass or more and 90% by mass or less, wherein
the copolymer has a weight-average molecular weight of 1,000 or more and 100,000 or less, and
the dibasic acid ester (A) is at least one monomer selected from the group consisting of maleic acid diester, maleic acid monoester, fumaric acid diester, fumaric acid monoester, itaconic acid diester.

2. The surface control agent for a water-based coating according to claim 1, wherein
the copolymer contains, as constituent monomers, the dibasic acid ester (A), the polymerizable unsaturated monomer (B), and a copolymerizable unsaturated monomer (C) in an amount of 400 parts by mass or less when a total amount of the dibasic acid ester (A) and the polymerizable unsaturated monomer (B) is 100 parts by mass, and
the copolymerizable unsaturated monomer (C) is a monomer different from the dibasic acid ester (A) and the polymerizable unsaturated monomer (B).

3. The surface control agent for a water-based coating according to claim 2, wherein
the copolymerizable unsaturated monomer (C) is at least one monomer selected from the group consisting of an alkyl (meth)acrylate, polymerizable unsaturated monomer having a hydroxyl group, polymerizable unsaturated monomer having an amide group, polymerizable unsaturated monomer having a glycol group, polymerizable unsaturated monomer having a glycidyl group, polymerizable unsaturated monomer having a carboxyl group, multifunctional unsaturated monomer, and a reactive silicone having a methacryloyloxy group.

4. The surface control agent for a water-based coating according to claim 1, wherein
$R^2$ in the general formula (1) is a (meth)acryloyl group, a vinyl ether group, or an allyl group.

5. A water-based coating composition comprising: a surface control agent for a water-based coating in an amount of 0.1% by mass or more and 10% by mass or less when a total resin solid content is 100% by mass, wherein
the surface control agent for a water-based coating contains a copolymer containing, as constituent monomers,
a dibasic acid ester (A) having a polymerizable unsaturated double bond in an amount of 10% by mass or more and 99% by mass or less, and
a polymerizable unsaturated monomer (B) containing an ether group represented by a general formula (1):

$$R^1\text{—}(C_mH_{2m}O)_n\text{—}R^2 \quad (1)$$

(where $R^1$ represents a (meth)acryloyl group, a vinyl ether group, or an allyl group, $R^2$ represents a hydrogen atom, a (meth)acryloyl group, a vinyl ether group, an allyl group, or an alkyl group with 1 to 22 carbon atoms, m is a number from 2 to 4, and n is a number from 2 to 100) in an amount of 1% by mass or more and 90% by mass or less,
the copolymer has a weight-average molecular weight of 1,000 or more and 100,000 or less, and
the dibasic acid ester (A) is at least one monomer selected from the group consisting of maleic acid diester, maleic acid monoester, fumaric acid diester, fumaric acid monoester, itaconic acid diester.

6. A coating film obtained by curing a water-based coating composition, wherein
the water-based coating composition contains a surface control agent for a water-based coating in an amount of 0.1% by mass or more and 10% by mass or less when a total resin solid content is 100% by mass, the surface control agent for a water-based coating contains a copolymer containing, as constituent monomers, a dibasic acid ester (A) having a polymerizable unsaturated double bond in an amount of 10% by mass or more and 99% by mass or less, and a polymerizable unsaturated monomer (B) containing an ether group represented by a general formula (1):

$$R^1-(C_mH_{2m}O)_n-R^2 \qquad (1)$$

(where $R^1$ represents a (meth)acryloyl group, a vinyl ether group, or an allyl group, $R^2$ represents a hydrogen atom, a (meth)acryloyl group, a vinyl ether group, an allyl group, or an alkyl group with 1 to 22 carbon atoms, m is a number from 2 to 4, and n is a number from 2 to 100) in an amount of 1% by mass or more and 90% by mass or less, the copolymer has a weight-average molecular weight of 1,000 or more and 100,000 or less, and the dibasic acid ester (A) is at least one monomer selected from the group consisting of maleic acid diester, maleic acid monoester, fumaric acid diester, fumaric acid monoester, itaconic acid diester.

7. The coating film according to claim 6 comprising: a topcoat film applied to all or part of a surface of the coating film obtained by curing the water-based coating composition.

* * * * *